June 5, 1956  L. G. SIMJIAN  2,748,651
MICROFILM CAMERA

Filed April 27, 1953  3 Sheets-Sheet 1

INVENTOR.
LUTHER G. SIMJIAN

BY Ralph E. Bitner

ATTORNEY

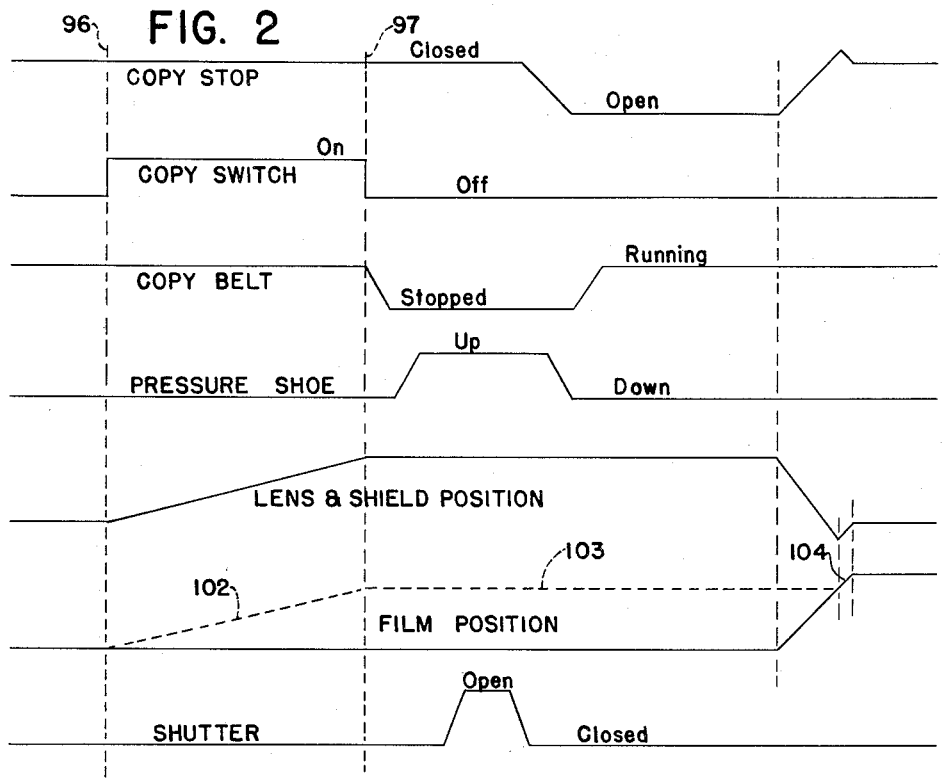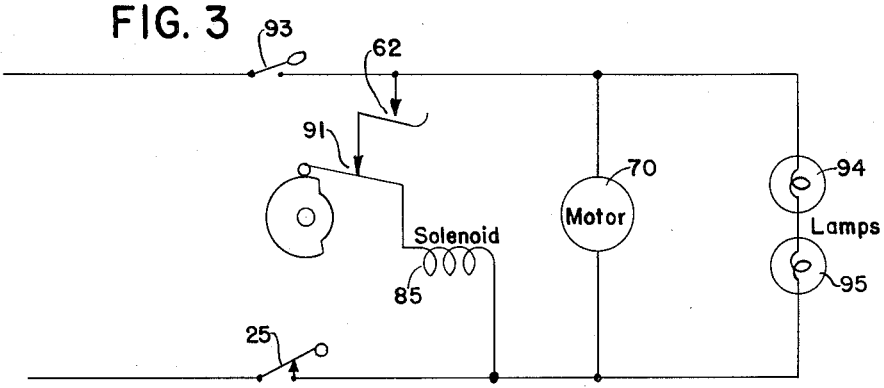

June 5, 1956     L. G. SIMJIAN     2,748,651
MICROFILM CAMERA
Filed April 27, 1953
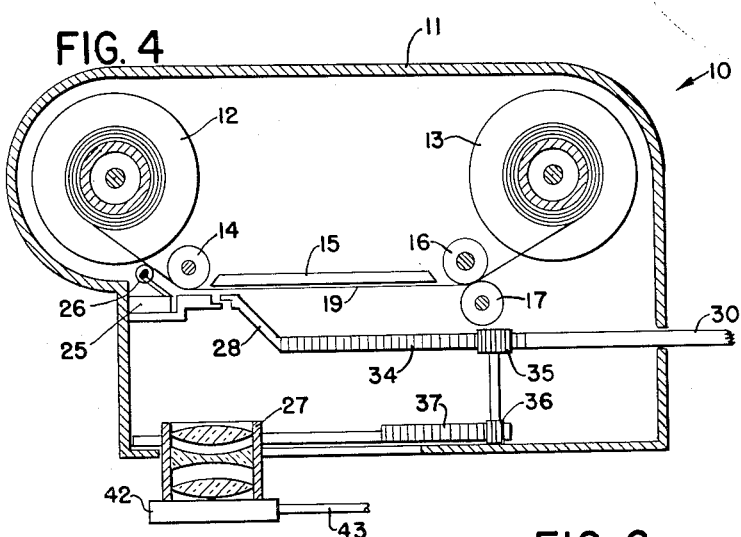
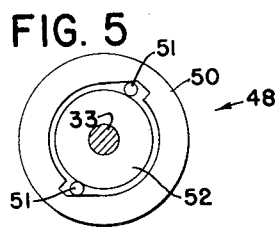
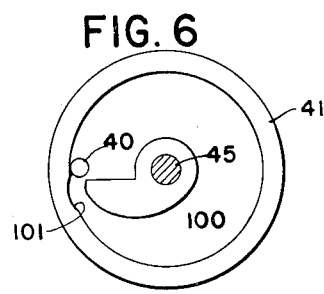
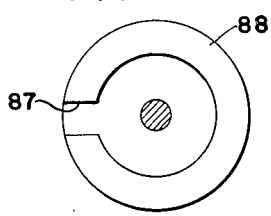
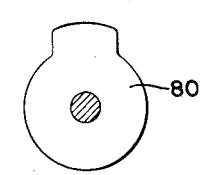
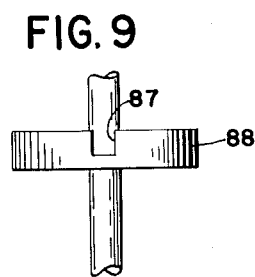
LUTHER G. SIMJIAN
INVENTOR.
BY Ralph E. Bitner
ATTORNEY United States Patent Office 2,748,651
Patented June 5, 1956

2,748,651

MICROFILM CAMERA

Luther G. Simjian, Greenwich, Conn., assignor to The Reflectone Corporation, Stamford, Conn., a corporation of Connecticut Application April 27, 1953, Serial No. 351,183

7 Claims. (Cl. 88—24)

This invention relates to a camera for photographing documents of various sizes and has particular reference to the movement of the film in the camera which is controlled by the movement of a document in an object plane.

As used throughout the specification and claims the term "document" refers to any reproducible information, such as written or printed matter which is contained on the surface of a thin sheet of paper or like material.

Many microfilm cameras have been constructed for the purpose of copying the information on documents. Some of these cameras are adjusted to take a single picture on a predetermined size of film. Other cameras are arranged to photograph a moving document while the film also moves. This necessitates a precise and accurate control of the relative motions of the document and film and results generally in an expensive machine which is difficult to adjust and maintain. Other cameras have been designed and used in which the film motion is manually controlled to coincide with the size of the document to be photographed. Such an arrangement requires considerable time for the adjustments when documents of varied size are being photographed. The invention described herein uses only as much film as is necessary. The size of the document automatically controls the amount of film moved into the image plane and for this reason there is no wasted time consumed in making manual adjustments.

One of the objects of this invention is to provide an improved microfilm camera which avoids one or more of the disadvantages and limitations of prior art arrangements.

Another object of the invention is the control of the film motion in a microfilm camera by means of the document to be copied.

Another object of the invention is to provide an inexpensive microfilm camera which includes all the advantages of prior art cameras.

Another object of the invention is to provide a microfilm camera which photographs documents at rest thereby insuring a sharper image and greater flexibility in lighting and time of exposure.

One feature of the invention includes a camera for photographing documents at rest and comprises a means for moving an unexposed film into an image plane, the extent of such movement being controlled by the length of a document which is to be photographed.

Another feature of the invention includes a structure which moves the camera lens an amount which is proportional to the movement of the film and the size of the document to be photographed.

For a better understanding of the present invention together with other and further objects, thereof, reference is made to the following description taken in connection with the accompanying drawings.

Fig. 2 is a timing diagram which explains the relative motion of the various moveable parts of the controlling mechanism.

Fig. 3 is a wiring diagram showing how the electrically operated units are connected.

Fig. 4 is a cross sectional view of the camera.

Fig. 5 is a detailed view of a one-way clutch which is employed to move the film.

Fig. 6 is a detailed view of a cam arrangement which resets the film moving mechanism.

Fig. 7 is a detailed view of one of the mechanical controls for operating a one revolution clutch.

Fig. 8 is a detailed view of a cam which is employed to hold the document in position while the picture is being taken.

Fig. 9 is a side view of the control arrangement shown in Fig. 7.

Figure 1:
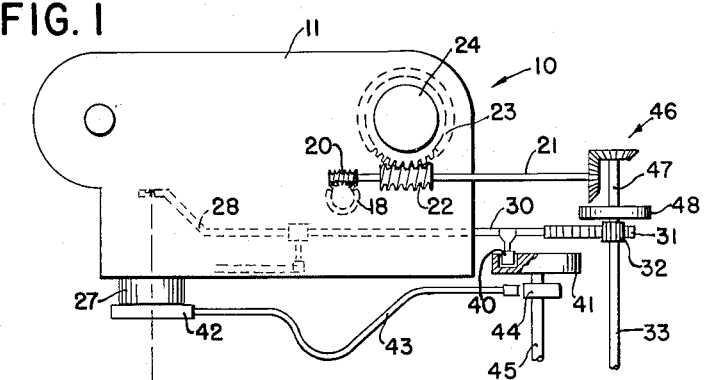
Fig. 1 is a side view, partly schematic, showing the camera, the object plane, and the structure which controls the movements of the document, the film, and the lens.
Figure 1:
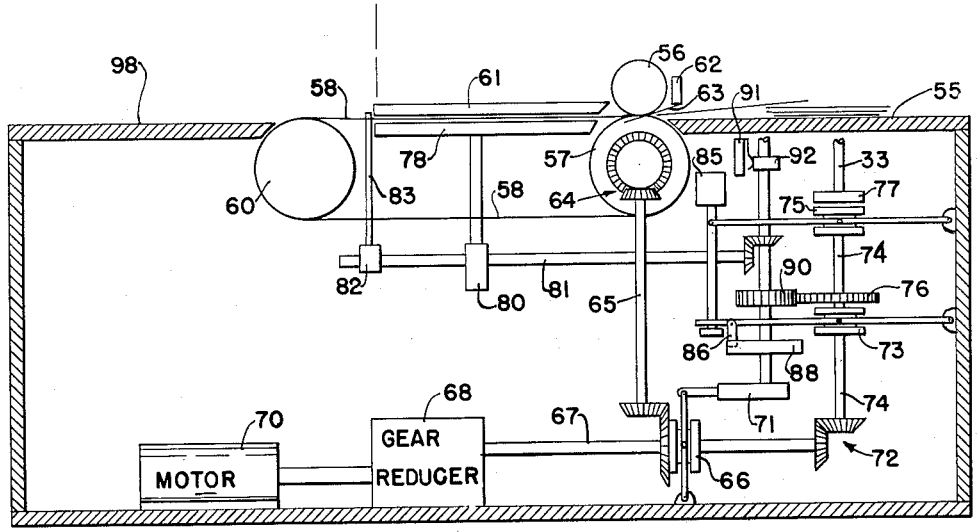

Referring now to the figures a camera 10 includes a light type box 11 which contains two film spools 12 and 13. The unexposed film 19 is loaded on spool 12 and is threaded around an idler roller 14 through an image plane which is adjacent to a backing plate 15 and then between a power driven roller 16 and a second idler 17 and is finally wound on the take-up spool 13. The power driven roller 16 may contain sprockets and be used with a film having sprocket holes but this is not necessary and a plain roller may be used. Roller 16 is driven by a gear 18 which meshes with a worm 20. This worm is secured to a shaft 21 which also turns a second worm 22 meshing with a larger gear 23. Gear 23 turns on a center which is aligned with spool 13 and is connected to the spool axis by a friction plate 24. The gearing is arranged so that gear 23 turns slightly faster than the maximum motion of the film. This means that the friction wheel 24 will always slip to some extent when the film is being moved.

In order to insure that the camera will not be operated without film a safety switch 25 is mounted in the camera case with a roller 26 which presses against the unexposed film. When the camera has been improperly threaded with film or when the film runs out switch 25 will open thereby disabling the camera operation and turning off the lamps.

Between the film 19 and a lens 27 is mounted a moveable shield 28 which may be moved to the right to expose a portion of the film. This motion is controlled by a rod 30 which is secured to a rack 31 which in turn meshes with a gear 32 fast on shaft 33. Inside the camera case shaft 30 is attached to a second rack 34 which meshes with a gear 35 which is in turn secured to another gear 36 meshing with another rack 37. Gears 35 and 36 have a gear ratio of two to one so that when shaft 30 is moved to the right, thereby moving shield 28, the lens 27 is also moved to the right but only half the distance of the shield motion. This structure is the preferred embodiment of the camera arrangement. However, if the image plane is not too large and the shield 28 is not moved for a distance which is greater than the focal length of the lens the structure which moves the lens may be omitted and the lens secured to the camera box 11 in a position which is approximately aligned with the middle of the image plane.

Rod 30 also carries a cam roller 40 which fits into a cam 41 (Fig. 6). This cam and roller cooperate to reset the shield mechanism after the picture has been taken.

The lens 27 may be any type of photographic lens suited to document photography. It includes a shutter arrangement 42 which may consist of any of the well known types of camera shutters and which is operated by a cable 43 enclosed in a tubular sheath, commonly known as Bowden wire. The shutter is actuated by a cam 44 which is secured to a shaft 45 which also turns cam 41.

Worm gears 20 and 22 are turned by shaft 21 which is secured to a gear arrangement 46 which transmits power to the worm gears from a short stub shaft 47. The lower end of this shaft is secured to part of a one-way clutch 48 which is shown in detail in Fig. 5. This clutch includes an outer rim 50 having one or more surface chambers which contain rollers or ball bearings 51. Aligned with the rim 50 is an inner cylinder 52 which is secured to shaft 33 and which causes rotation of rim 50 when turned in the proper direction. This clutch 48 may be installed to operate in either direction as will be explained later when the operation of the device is described.

Documents are arranged on a platform 55 on the base of the machine which comprises a box-like enclosure and includes the mechanism which moves the documents into the object plane of the camera and which control generally the operation of the camera film and the shield.

The documents are fed manually to a position where they will be engaged by two rollers, one of which is an idler 56 and another is a power driven roller 57 which runs a split belt 58 over another idler 60. The belt travels through the object plane of the camera and passes just below a transparent plate 61. A copy switch 62 is mounted in front of idler roller 56 with an arm 63 which extends through a slot in belt 58 and which is moved to a contact making position each time a document passes between rolls 56 and 57. This same switch breaks contact as soon as the trailing edge of the document moves out of range of arm 63. Roll 57 is driven by a gear arrangement 64 and shaft 65 which in turn is driven by a clutch 66 deriving power from a power shaft 67. This shaft is connected to a gear reducer 68 and a motor 70. Clutch 66 is held in engagement by cam 71 which is in its actuating condition when there is no document in the object plane. This means that roller 57, belt 58 and idler 60 are moving at all times prior to the entrance of a document.

Power shaft 67 is connected through gears 72 to the moveable part of a clutch 73. Element 73 is splined to shaft 74 as is also part of a second clutch 75. When clutch 73 is moved into an engagement with a gear 76 power is provided to turn shaft 45. When clutch element 75 is moved into an engagement with element 77 power is transmitted to shaft 33 which operates the film, the film shield, and the lens 27.

In order to flatten out the document and to insure that the document is retained at rest while film is being exposed, a flat shoe 78 is pressed upwardly against belt 58 and the document by a cam 80. This cam is turned by shaft 81 which is geared directly to shaft 45. Another cam 82 is secured to shaft 81 and raises or lowers a document stop 83. This stop is not entirely necessary since the mechanism is designed to stop the copy just prior to making contact with the stop. It is, however, included in the structure as a safety device.

Operation of clutches 75 and 73 is accomplished by an electromagnetic solenoid 85 which is actuated when the document switch 62 is closed. Actuation of solenoid 85 operates both clutches and in doing so lifts a pawl 86. Pawl 86 fits into a slot 87 in a cam 88 (Fig. 7) and when the pawl is lifted shaft 45 starts to rotate because clutch 73 turns gear 76 which in turn rotates another gear 90 which is secured to shaft 45. This arrangement means that once pawl 86 is lifted cam 88 starts to revolve and even though the solenoid 85 is quickly normalized, clutch 73 still remains actuated because pawl 86 rides on the top surface of cam 88 until a complete revolution of cam 88 has been effected. At the end of one revolution pawl 86 drops into slot 87, thereby releasing clutch element 73 and stopping shaft 45.

As an added safety measure a switch 91 is secured adjacent to shaft 45 with the switch arm making contact with a small cam 92. This switch opens a circuit which might exist between one side of the line switch 62 and the solenoid and is to prevent continued operation of the document belt 58 in case a long document is fed into the machine and switch arm 63 is not released before the leading edge of the document strikes the stop bar 83.

The operation of the camera will now be described making reference to Figs. 1 and 4 showing the mechanism and Fig. 2 which shows the timing diagram. The operator first closes switch 93 which connects a line voltage to the motor 70 and lamps 94, 95. This action starts the motor running and through clutch 66 turns the rollers which move document belt 58. The lamps are also lighted, giving the object space sufficient illumination for photographing on the film. At this time shaft 74 is turning but clutch 73 and clutch 75 are both disengaged and shafts 33 and 45 are at rest. A document is now fed into the space between rollers 56 and 57 and is engaged by them and carried into the object space below plate 61 operating switch arm 63 and closing switch 62, this point on the timing diagram being indicated by dotted line 96. As soon as switch 62 is closed the solenoid 85 is actuated and clutches 73 and 75 are moved into engagement with elements 76 and 77. When the document passes the entrance point switch 62 is again open and solenoid 85 is deenergized normalizing clutch 75 and stopping the rotation of shaft 33. Clutch 73, however, continues to turn gear 76 and shaft 45 for a complete revolution. The time of opening switch 62 is indicated on the timing diagram by dotted line 97. When shaft 33 is rotated it pulls rod 30 to the right as indicated in Figs. 1 and 4 and thereby pulls shield 28 and lens 27 both to the right portion of the film 19. In the preferred embodiment clutch 48 does not transmit the first rotation of shaft 33 and therefore the film 19 does not move at this time. The motion of shaft 33 stops as soon as the trailing edge of the document has moved past switch arm 63 and therefore the amount of opening of shield 28 is proportional to the document length. Shaft 45 starts to turn the same time shaft 33 starts to turn but the cams on this shaft do not operate until after the document has been completely positioned below transparent plate 61. At this point cam 71 opens clutch 66 and the document belt 58 stops a short time after the positioning of the document cam 80 pushes shoe 78 into engagement with the belt, the document, and plate 61. Then cam 44 actuates the Bowden wire 43 opening the shutter 42 taking the picture. Then in sequence, the shoe 78 returns to its normal position the document stop 83 is lowered, the belt 58 starts running, and the document is run out of the object plane to a storage position 98. Shaft 44 continues to rotate and cam 41 turns far enough to engage roller 40 by internal cam surface 100 and force the roller and rod 30 back to its original position. This motion moves rack 31 to the left and closes shield 28. It also rotates shaft 33 in the reverse direction and actuates shaft 47 through the one-way clutch 48. This action rotates shaft 21 and draws the film 19 through the image space winding it on spool 13 and unwinding spool 12. As shaft 45 makes a complete revolution, roller 40 is brought back to its original position and in addition is moved a short distance to the left because of the cutout portion 101 and the associated part of the cam 100. This draws a slight extra amount of film through the camera providing a space between pictures. When the shield and lens have been reset to their original positions the cycle is over and the machine is ready to accept a new document for the next cycle.

It is possible to change the operation slightly by reversing the one-way clutch 48. If this is done the film and the shield 28 will move together as the shield is opened and the film 19 will not move when the shield is closed. This condition is indicated on the timing diagram by dotted lines 102 and 103, the motion of the film being indicated by incline line 102 and the stationary condition indicated by horizontal line 103. The additional movement which puts a small margin between successive exposures occurs at the same time in the cycle regardless of the position of clutch 48 and is shown in the timing diagram by the short line 104.

For the sake of clearness shafts 45 and 33 have not been coupled between the camera portion of the mechanism and the base portion. In Fig. 1 and also in Fig. 4 many structural components have been omitted because they were not a part of the invention.

From the above description it will be evident that the invention provides a means for photographing a document at rest and automatically moves just enough film into the image space to photograph the document and leave a small margin.

While there have been described and illustrated specific embodiments of the invention, it will be obvious that various changes and modifications may be made therein without departing from the field of the invention which should be limited only by the scope of the appended claims.

I claim:

1. A camera for photographing documents comprising; a lens positioned between an object plane and an image plane; conveyor means for moving a document into the object plane; a friction roller for moving unexposed film into the image plane; a sensing mechanism at the conveyor for measuring the length of the document, and coupling means between the sensing mechanism and the friction roller which moves the film along the image plane a distance which is equal to the length of the document times the ratio of the image distance to the object distance plus a margin distance; mechanical means coupled to the film moving means which moves the lens half the distance of the film motion; a shield adjacent to the image plane which is moved prior to each exposure to uncover the film which has been moved into the image plane and to cover the remaining film; and means for exposing the film when both the film and the document are at rest.

2. A camera for photographing documents at rest comprising; a lens positioned between an object plane and an image plane; a sensing station equipped with sensing means which is actuated when the leading edge of the document passes through the sensing station and normalized when the trailing edge of said document leaves said sensing station; conveying means for moving the document to be photographed into the object plane; intermittent drive means actuated in response to the operation of said sensing means and causing said document to come to rest when positioned for photographing in said object plane; means for moving a length of unexposed film into the image plane and bringing it to rest therein in response to the operation of said intermittent drive means; an opaque shield normally covering the film to be exposed mounted in juxtaposition thereto; said shield being movable and moving in response to the operation of said intermittent drive means to uncover a length of film proportional to the document length; means for exposing the uncovered portion of the film when both the film and the document are at rest; said exposing means including a photographic shutter operated in response to the actuation of said intermittent drive means when the film and document are at rest, and means driven by said intermittent drive means and actuated in response to the exposing of said film to reset said shield to cover the film.

3. A camera for photographing documents at rest comprising; a lens positioned between an object plane and an image plane; a sensing station equipped with sensing means which is actuated when the leading edge of the document passes through the sensing station and normalized when the trailing edge of said document leaves said sensing station; conveying means for moving the document to be photographed into the object plane; intermittent drive means actuated in response to the operation of said sensing means and causing said document to come to rest at a predetermined location when positioned for photographing in said object plane; means for moving a length of unexposed film into the image plane and bringing it to rest therein in response to the operation of said intermittent drive means; an opaque shield normally covering the film to be exposed mounted in juxtaposition thereto; said shield being movable and moving in response to the operation of said intermittent drive means to uncover a length of film proportional to the document length; means for moving said lens responsive to the operation of said intermittent drive by an amount proportional to the document length relative to said predetermined location; means for exposing the uncovered portion of the film when both the film and the document are at rest; said exposing means including a photographic shutter operated in response to the actuation of said intermittent drive means when the film and document are at rest, and means driven by said intermittent drive means and actuated in response to the exposing of said film to reset said shield to cover the film.

4. A camera for photographing documents at rest comprising, a lens positioned between an object plane and an image plane, conveyor means for moving a document into the object plane, a sensing means which is actuated when the document enters a sensing position and is normalized when the document leaves said position, a film engaging means which moves a length of unexposed film into the image plane, a shield which normally covers the film and is mounted adjacent thereto, said shield and said film engaging means both connected to an operating means which is energized when the sensing means is actuated and is de-energized after the document has moved a predetermined distance, said operating means connected to the shield and film to move them prior to each exposure to uncover the film which has been moved into the image plane and to stop the shield and film when the sensing means is normalized, said operating means also adapted to stop the conveyor means after the document has been moved said predetermined distance, and means for exposing the unshielded film when both the film and the document are at rest, said means including a lens shutter which is operated by said operating means after the document comes to rest.

5. A camera for photographing documents at rest comprising; a lens positioned between an object plane and an image plane; conveyor means for moving a document into the object plane; a sensing means which is actuated when the document enters a sensing position and is normalized when the document leaves said position; a film engaging means which moves a length of unexposed film into the image plane; a shield which normally covers the film and is mounted adjacent thereto; means for moving the lens half the distance the shield is moved; operating means controlled to start when the sensing means is actuated and to stop after the document has moved a predetermined distance; said operating means coupled to the film engaging means, the shield, and the lens; said operating means adapted to move the shield and the lens when the sensing means is actuated prior to each exposure to uncover the film which has been moved into the image plane and to stop the shield and lens when the sensing means is normalized; said operating means also adapted to stop the conveyor means when the operating means is stopped; and means for exposing the unshielded film when both the film and the document are at rest; said means including a lens shutter which is operated by said operating means after the document comes to rest.

6. A camera for photographing documents at rest in accordance with claim 5 wherein said operating means includes a coupling means which is normally actuated to move the conveyor means and is disengaged by a cam controlled by the sensing means.

7. A camera for photographing documents at rest in accordance with claim 6 wherein said operating means starts the conveyor means after an exposure has been made to eject the document from the object plane.

References Cited in the file of this patent

UNITED STATES PATENTS

| | | |
|---|---|---|
| 1,806,763 | McCarthy | May 26, 1931 |
| 1,847,531 | Kesses | Mar. 1, 1932 |
| 2,001,598 | Caps | May 14, 1935 |
| 2,496,329 | Briechle | Feb. 7, 1950 |
| 2,621,561 | Andersson | Dec. 16, 1952 |